US010411476B2

(12) United States Patent
Kuwahara et al.

(10) Patent No.: US 10,411,476 B2
(45) Date of Patent: Sep. 10, 2019

(54) POWER CONVERSION APPARATUS, POWER CONVERSION METHOD, AND POWER CONVERSION SYSTEM

(71) Applicant: KYOCERA Corporation, Kyoto-shi, Kyoto (JP)

(72) Inventors: Hitoshi Kuwahara, Daito (JP); Masaya Kojima, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 69 days.

(21) Appl. No.: 15/577,079

(22) PCT Filed: May 26, 2016

(86) PCT No.: PCT/JP2016/002553
§ 371 (c)(1),
(2) Date: Nov. 27, 2017

(87) PCT Pub. No.: WO2016/189874
PCT Pub. Date: Dec. 1, 2016

(65) Prior Publication Data
US 2018/0183240 A1    Jun. 28, 2018

(30) Foreign Application Priority Data

May 27, 2015    (JP) .................. 2015-107727

(51) Int. Cl.
| | |
|---|---|
| *H02M 1/15* | (2006.01) |
| *H02M 7/44* | (2006.01) |
| *H02J 3/38* | (2006.01) |
| *H02M 1/00* | (2006.01) |
| *H02J 3/01* | (2006.01) |

(52) U.S. Cl.
CPC .............. *H02J 3/383* (2013.01); *H02M 1/15* (2013.01); *H02M 7/44* (2013.01); *H02J 3/01* (2013.01);

(Continued)

(58) Field of Classification Search
CPC ............ H02J 3/383; H02M 1/14; H02M 1/15; H02M 7/42; H02M 7/44

(Continued)

(56) References Cited

U.S. PATENT DOCUMENTS

| | | | |
|---|---|---|---|
| 10,211,640 B2 * | 2/2019 | Dent | ........................ H02J 3/383 |
| 2006/0221657 A1 | 10/2006 | Kusumi | |
| 2011/0103114 A1 * | 5/2011 | Huang | .............. H01L 31/02021 363/131 |

FOREIGN PATENT DOCUMENTS

| | | |
|---|---|---|
| JP | H04-34888 U | 3/1992 |
| JP | H10-303674 A | 11/1998 |

(Continued)

OTHER PUBLICATIONS

International Search Report dated Aug. 9, 2016, issued by Japan Patent Office for International Application No. PCT/JP2016/002553.

(Continued)

*Primary Examiner* — William Hernandez
(74) *Attorney, Agent, or Firm* — Procopio Cory Hargreaves and Savitch LLP (57) ABSTRACT

A power conversion apparatus, power conversion method, and a power conversion system can reduce the occurrence of unnecessary power loss. The power conversion apparatus converts direct current (DC) power supplied by a solar cell into alternating current (AC) power. The power conversion apparatus includes a DC filter unit, a memory, and a controller. The DC filter unit includes a noise filter that reduces noise in the DC power supplied by the solar cell and a switch that connects an input terminal and an output terminal of the noise filter. The controller controls the switch in accordance with output power of the DC filter unit.

10 Claims, 5 Drawing Sheets

(52) U.S. Cl.
CPC ............... *H02M 2001/007* (2013.01); *H02M 2001/0048* (2013.01); *Y02B 70/1491* (2013.01)

(58) Field of Classification Search
USPC ... 307/43, 52, 112, 113, 115, 116, 125, 126, 307/151
See application file for complete search history.

(56) References Cited

FOREIGN PATENT DOCUMENTS

| | | |
|---|---|---|
| JP | 2000-83380 A | 3/2000 |
| JP | 2004-220783 A | 8/2004 |
| JP | 2005-117758 A | 4/2005 |
| JP | 2005-204485 A | 7/2005 |
| JP | 2006-280135 A | 10/2006 |
| JP | 2008-148062 A | 6/2008 |
| JP | 2009-254035 A | 10/2009 |
| JP | 2012-100459 A | 5/2012 |
| JP | 2014-176120 A | 9/2014 |

OTHER PUBLICATIONS

Written Opinion of the International Searching Authority dated Aug. 9, 2016, issued by Japan Patent Office for International Application No. PCT/JP2016/002553.

\* cited by examiner

POWER CONVERSION APPARATUS, POWER CONVERSION METHOD, AND POWER CONVERSION SYSTEM

CROSS-REFERENCE TO RELATED APPLICATION

This application claims priority to and the benefit of Japanese Patent Application No. 2015-107727 filed May 27, 2015, the entire contents of which are incorporated herein by reference.

TECHNICAL FIELD

This disclosure relates to a power conversion apparatus, a power conversion method, and a power conversion system.

BACKGROUND

In recent years, power conversion apparatuses that convert direct current (DC) power, generated with an energy source such as sunlight or wind, into alternating current (AC) power for connection to a commercial power grid have become more common. Power conversion apparatuses that use switching methods are known.

In a power conversion apparatus using a switching method, noise is generated by on/off control of a switching element in a DC/DC converter or the like. In such a power conversion apparatus, the amount of noise leaking out of the power conversion apparatus is reduced through use of a noise filter (Patent Literature (PTL) 1).

CITATION LIST

Patent Literature

PTL 1: JP 2008-148062 A

SUMMARY

A power conversion apparatus according to an embodiment of the disclosure converts DC power supplied by a distributed power source into AC power. The power conversion apparatus includes a filter unit including a noise filter configured to reduce noise in the DC power supplied by the distributed power source, and a switch configured to connect an input terminal and an output terminal of the noise filter; and a controller configured to control the switch in accordance with output power of the filter.

A power conversion apparatus according to an embodiment of the disclosure converts DC power supplied from a plurality of distributed power sources into AC power. The power conversion apparatus includes a plurality of filter units configured to reduce noise in the DC power supplied by the plurality of distributed power sources; and a controller. Each filter unit includes a noise filter configured to reduce the noise in the DC power supplied by the plurality of distributed power sources, and a switch configured to connect an input terminal and an output terminal of the noise filter. The controller is configured to control a plurality of the switches in accordance with a total output power that is a summation of output powers of the plurality of filter units.

A power conversion method according to an embodiment of the disclosure is a method in a power conversion apparatus for converting DC power supplied by a distributed power source into AC power, the power conversion apparatus including a filter unit configured to reduce noise in the DC power supplied by the distributed power source. The filter unit includes a noise filter configured to reduce the noise in the DC power supplied by the distributed power source and a switch configured to connect an input terminal and an output terminal of the noise filter. The power conversion method includes calculating an output power of the filter unit; and controlling the switch in accordance with the output power.

A power conversion method according to an embodiment of the disclosure is a method in a power conversion apparatus for converting DC power supplied by a plurality of distributed power sources into AC power, the power conversion apparatus including a plurality of filter units configured to reduce noise in the DC power supplied by the plurality of distributed power sources. Each filter unit includes a noise filter configured to reduce the noise in the DC power supplied by the plurality of distributed power sources and a switch configured to connect an input terminal and an output terminal of the noise filter. The power conversion method includes calculating a total output power that is a summation of the output powers of the plurality of filter units; and controlling a plurality of the switches in accordance with the total output power.

A power conversion system according to an embodiment of the disclosure includes a distributed power source and a power conversion apparatus for converting DC power supplied by the distributed power source into AC power. The power conversion apparatus includes a filter unit including a noise filter configured to reduce noise in the DC power supplied by the distributed power source and a switch configured to connect an input terminal and an output terminal of the noise filter; and a controller configured to control the switch in accordance with output power of the filter unit.

A power conversion system according to an embodiment of the disclosure includes a plurality of distributed power sources and a power conversion apparatus for converting DC power supplied by the plurality of distributed power sources into AC power. The power conversion apparatus includes a plurality of filter units configured to reduce noise in the DC power supplied by the plurality of distributed power sources; and a controller. Each filter unit includes a noise filter configured to reduce the noise in the DC power input from the plurality of distributed power sources and a switch configured to connect an input terminal and an output terminal of the noise filter. The controller controls a plurality of the switches in accordance with a total output power that is a summation of output powers of the plurality of filter units.

DETAILED DESCRIPTION

In some cases, the power conversion efficiency of a power conversion apparatus which utilizes a noise filter may deteriorate due to power loss caused by the resistance component of a choke coil or the like included in the noise filter. Further, in a power conversion apparatus using a switching method as the power converted by the power conversion apparatus increases, the noise leaking out of the power conversion apparatus also tends to increase. Conversely, as the power converted by the power conversion apparatus decreases, the noise leaking out of the power conversion apparatus tends to decrease. Therefore, the noise filter needs to be designed so that in the case where the power to be converted by the power conversion apparatus changes, the noise leaking out of the power conversion apparatus is equal to or less than a prescribed value when the power conversion apparatus converts power prescribed as the maximum rated power.

Furthermore, among power conversion apparatuses, the power supplied by power conditioners for solar power generation and power conditioners for wind power generation changes in a relatively short time. The power to be converted therefore also changes in a relatively short time.

Accordingly, when the power to be converted in a power conversion apparatus becomes small, the noise filter becomes redundant and, in some cases, may cause unnecessary power loss.

Power conversion apparatuses, power conversion methods, and power conversion systems according to the disclosed embodiments can reduce the occurrence of unnecessary power loss.

In this embodiment, a power conversion apparatus that converts DC power supplied by a distributed power source into AC power is described. Here, a distributed power source is a power supply that is distributed near the area where power is to be consumed and supplies power to the area where power is to be consumed. Examples of distributed power sources include solar cells, wind power generation apparatuses, and storage cells. Hereinafter, the distributed power sources are described as being solar cells and a storage cell.

First Embodiment of the Disclosure

Figure 1:
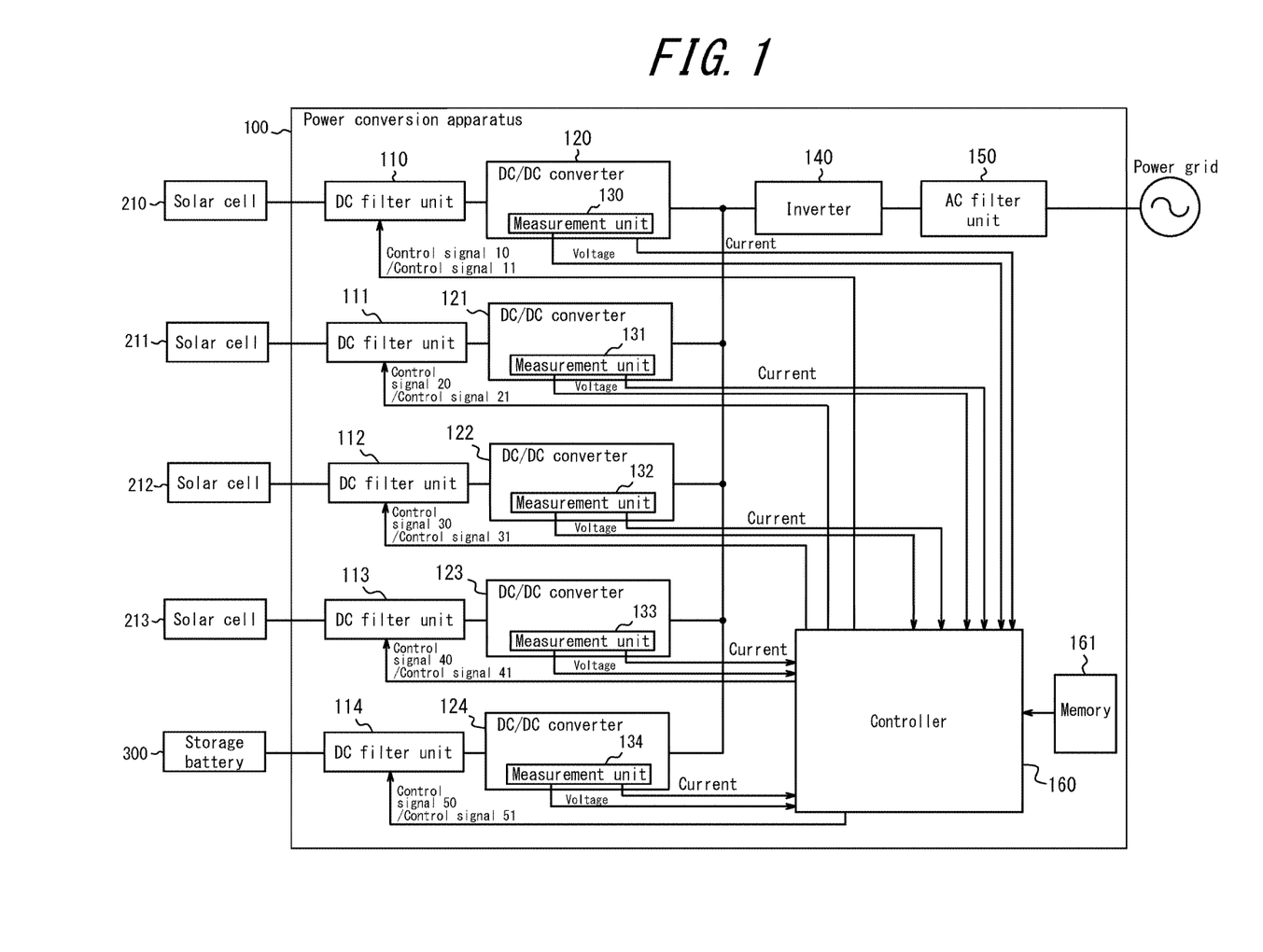
FIG. 1 illustrates an example configuration of a power conversion apparatus according to an embodiment of the disclosure.

As illustrated in FIG. 1, a power conversion apparatus 100 converts DC power supplied by solar cells 210, 211, 212, and 213 and a storage battery 300 into AC power, and supplies the converted AC power to a load or the like connected to a power grid.

The solar cells 210 to 213 convert solar energy to DC power and supply the converted DC power to the power conversion apparatus 100. The solar cells 210 to 213 can, for example, be arranged on the roof of a house.

The storage battery 300 supplies DC power to the power conversion apparatus 100 by discharging stored electricity. The storage battery 300 can, for example, be charged with electric power generated by the solar cells 210 to 213 or with electric power purchased from the power grid.

Next, the power conversion apparatus 100 is described further.

The power conversion apparatus 100 includes DC filter units (filters) 110, 111, 112, 113, and 114, DC/DC converters 120, 121, 122, 123, and 124, an inverter 140, an AC filter unit 150, a controller 160, and a memory 161.

The DC filter units 110 to 114 each reduce the noise in DC power supplied by the solar cells 210 to 213 and the storage battery 300, and supply the DC power after noise reduction to the DC/DC converters 120 to 124. The DC filter units 110 to 114 also control noise filters in the DC filter units 110 to 114 in response to control signals 10, 11, control signals 20, 21, control signals 30, 31, control signals 40, 41, and control signals 50, 51 provided by the controller 160. Details on the DC filter units 110 to 114 are provided below.

The DC/DC converters 120 to 124 each convert the voltage of the DC power supplied by the DC filter units 110 to 114 to a predetermined voltage and output the converted DC power to the inverter 140.

The DC/DC converters 120 to 124 respectively include measurement units 130, 131, 132, 133, and 134. The measurement units 130 to 134 each measure the voltage and the current at the output interface of the DC filter units 110 to 114 and output the measured voltage and current to the controller 160.

The inverter 140 converts the DC power supplied by the DC/DC converters 120 to 124 collectively into AC power and outputs the converted AC power to the AC filter unit 150.

The AC filter unit 150 reduces the noise in the AC power supplied by the inverter 140 and supplies the AC power after noise reduction to a load or the like connected to the power grid.

The controller 160 uses the voltages and currents acquired from the measurement units 130 to 134 to calculate a conversion power value to be converted by each of the DC/DC converters 120 to 124. The conversion power value to be converted by each of the DC/DC converters 120 to 124 is the value of power at the output interface of the DC filter units 110 to 114. The controller 160 outputs control signals 10, 11, control signals 20, 21, control signals 30, 31, control signals 40, 41, and control signals 50, 51 to the DC filter units 110 to 114 to control their respective noise filters on the basis of the calculated conversion power values and on power thresholds P01, P02, P03, power thresholds P11, P12, P13, power thresholds P21, P22, P23, power thresholds P31, P32, P33, and power thresholds P41, P42, P43 stored in the memory 161. Details of the functions of the controller 160 are provided below.

The memory 161 stores the power thresholds P01 to P03, P11 to P13, P21 to P23, P31 to P33, and P41 to P43. The power thresholds P01 to P03, P11 to P13, P21 to P23, P31 to P33, and P41 to P43 are power thresholds used when controlling the DC filter units 110 to 114.

The DC filter units 110 to 114 are described in detail below. Since the DC filter units 110 to 114 can adopt a variety of configurations, the DC filter unit 110 is described below as an example. Equivalent constituent elements in the DC filter units 110 to 114 are labeled below with the same reference signs for the sake of convenience.

Figure 2:
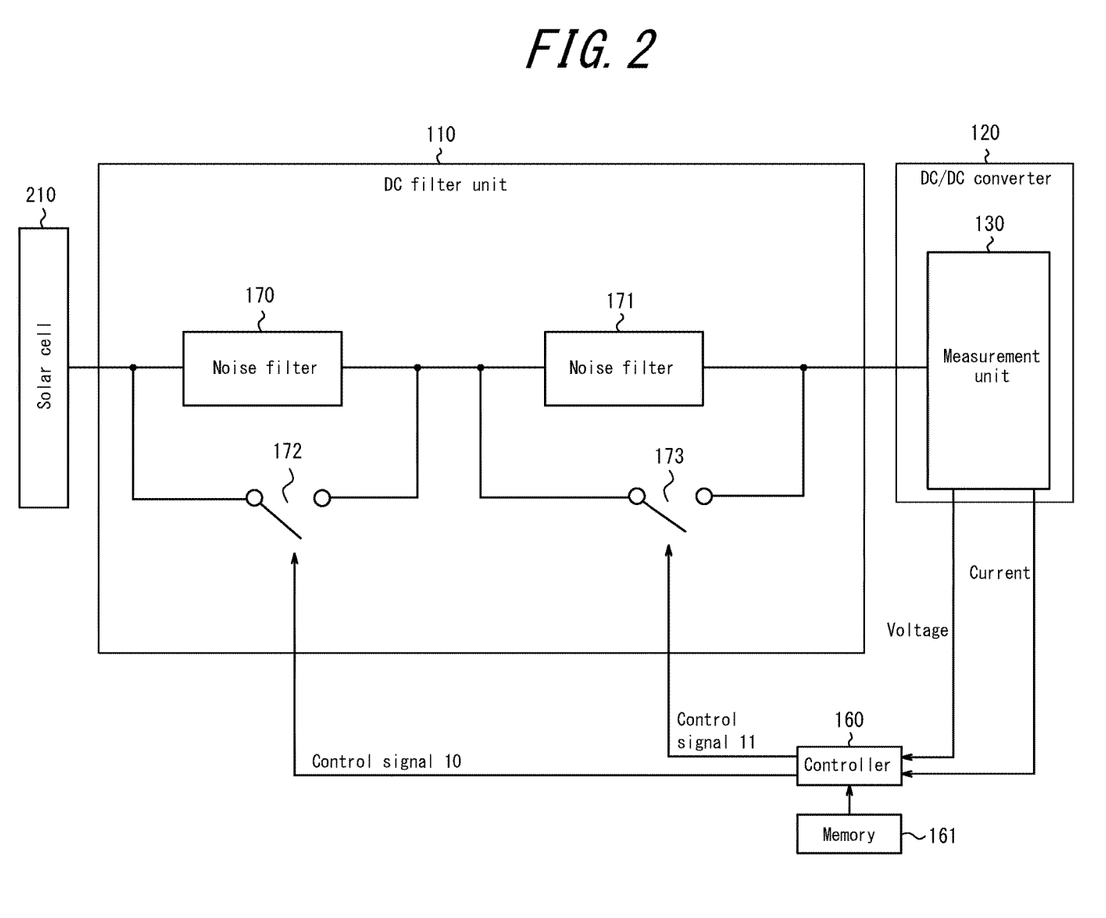
FIG. 2 illustrates an example configuration of the DC filter unit in FIG. 1.

As illustrated in FIG. 2, the DC filter unit 110 includes noise filters 170, 171 and switches 172, 173.

The noise filters 170, 171 are common mode filters that include a choke coil and the like. The input terminal of the noise filter 170 is connected to the solar cell 210, and the output terminal of the noise filter 170 is connected to the input terminal of the noise filter 171. The input terminal of the noise filter 171 is connected to the output terminal of the noise filter 170, and the output terminal of the noise filter 171 is connected to the DC/DC converter 120.

The noise filter 170 is described below as having a greater noise reduction effect than the noise filter 171 because, for example, the number of turns of the choke coil included in the noise filter 170 is greater than the number of turns of the choke coil included in the noise filter 171. In this case, the resistance of the noise filter 170 is also greater than the resistance of the noise filter 171 because, for example, the resistance of the coil conductor in the choke coil included in the noise filter 170 is greater than the resistance of the coil conductor in the choke coil included in the noise filter 171.

The switch 172 is, for example, connected between the input terminal and the output terminal of the noise filter 170 and is configured to allow connection of the input terminal and output terminal of the noise filter 170. The switch 172 connects the input terminal and the output terminal of the noise filter 170 upon changing to an "on" state in response to the control signal 10 provided by the controller 160. As a result, the DC power supplied by the solar cell 210 bypasses the noise filter 170. On the other hand, when the switch 172 changes to an "off" state in response to the control signal 11 provided by the controller 160, the DC power supplied to the input terminal of the noise filter 170 passes through the noise filter 170. An electromagnetic relay or a field effect transistor (FET), for example, can be used as the switch 172.

The switch 173 is, for example, connected between the input terminal and the output terminal of the noise filter 171 and is configured to allow connection between the input terminal and output terminal of the noise filter 171. The switch 173 connects the input terminal and the output terminal of the noise filter 171 upon changing to an "on" state in response to the control signal 11 provided by the controller 160. As a result, the DC power from the solar cell 210 bypasses the noise filter 171. On the other hand, when the switch 173 changes to an "off" state in response to the control signal 11 provided by the controller 160, the DC power supplied to the input terminal of the noise filter 171 passes through the noise filter 171. An electromagnetic relay or a FET, for example, can be used as the switch 173.

To sum up the noise reduction effect by the DC filter unit 110, when the switches 172, 173 are in the "off" state, the DC power supplied by the solar cell 210 is supplied to the DC/DC converter 120 through the noise filters 170, 171, and hence the noise reduction effect is the largest. When the switch 172 is in the "off" state and the switch 173 is in the "on" state, the DC power supplied by the solar cell 210 is supplied to the DC/DC converter 120 through the noise filter 170, and hence the noise reduction effect is the second from the largest. When the switch 172 is in the "on" state and the switch 173 is in the "off" state, the DC power supplied by the solar cell 210 is supplied to the DC/DC converter 120 through the noise filter 171, and hence the noise reduction effect is the third from the largest. When the switches 172, 173 are in the "on" state, the power supplied by the solar cell 210 is supplied to the DC/DC converter 120 without passing through the noise filters 170, 171, and hence the noise reduction effect is the smallest.

Next, details of the functions of the controller 160 are provided, using control of the DC filter unit 110 as an example. Here, the power thresholds P01 to P03 used when the controller 160 controls the DC filter unit 110 are set so that the power threshold P01 is the highest, the power threshold P02 is the second highest, and the power threshold P03 is the lowest. First, the controller 160 uses the voltage and current acquired from the measurement unit 130 to calculate the conversion power value P to be converted by the DC/DC converter 120. The controller 160 determines whether the calculated conversion power value P is greater than the highest power threshold P01. When the controller 160 determines that the calculated conversion power value P is greater than the highest power threshold P01, the controller 160 outputs control signals 10, 11 to the DC filter unit 110 so that the switches 172, 173 enter the "off" state. Conversely, when the controller 160 determines that the calculated conversion power value P is not greater than the highest power threshold P01, the controller 160 further determines whether the calculated conversion power value P is greater than the second highest power threshold P02. When the controller 160 determines that the calculated conversion power value P is greater than the second highest power threshold P02, the controller 160 outputs control signals 10, 11 to the DC filter unit 110 so that the switch 172 enters the "on" state and the switch 173 enters the "off" state. Conversely, when the controller 160 determines that the calculated conversion power value P is not greater than the second highest power threshold P02, the controller 160 further determines whether the calculated conversion power value P is greater than the lowest power threshold P03. When the controller 160 determines that the calculated conversion power value P is greater than the lowest power threshold P03, the controller 160 outputs control signals 10, 11 to the DC filter unit 110 so that the switch 172 changes to the "off" state and the switch 173 change to the "on" state. Conversely, when the controller 160 determines that the calculated conversion power value P is not greater than the lowest power threshold P03, the controller 160 outputs control signals 10, 11 to the DC filter unit 110 so that the switches 172, 173 changes to the "on" state. The controller 160 also calculates the conversion power values for the DC filter units 111 to 114 in the same way as for the DC filter unit 110 and outputs control signals 20, 21, control signals 30, 31, control signals 40, 41, and control signals 50, 41 to the DC filter units 111 to 114 on the basis of the calculated conversion power values and the power thresholds P11 to P13, P21 to P23, P31 to P33, and P41 to P43.

Next, operations of the power conversion apparatus 100 are described. Since the controller 160 performs similar control on the DC filter units 110 to 114 using control signals 10, 11, control signals 20, 21, control signals 30, 31, control signals 40, 41, and control signals 50, 51, the DC filter unit 110 is described below as an example.

Figure 3:
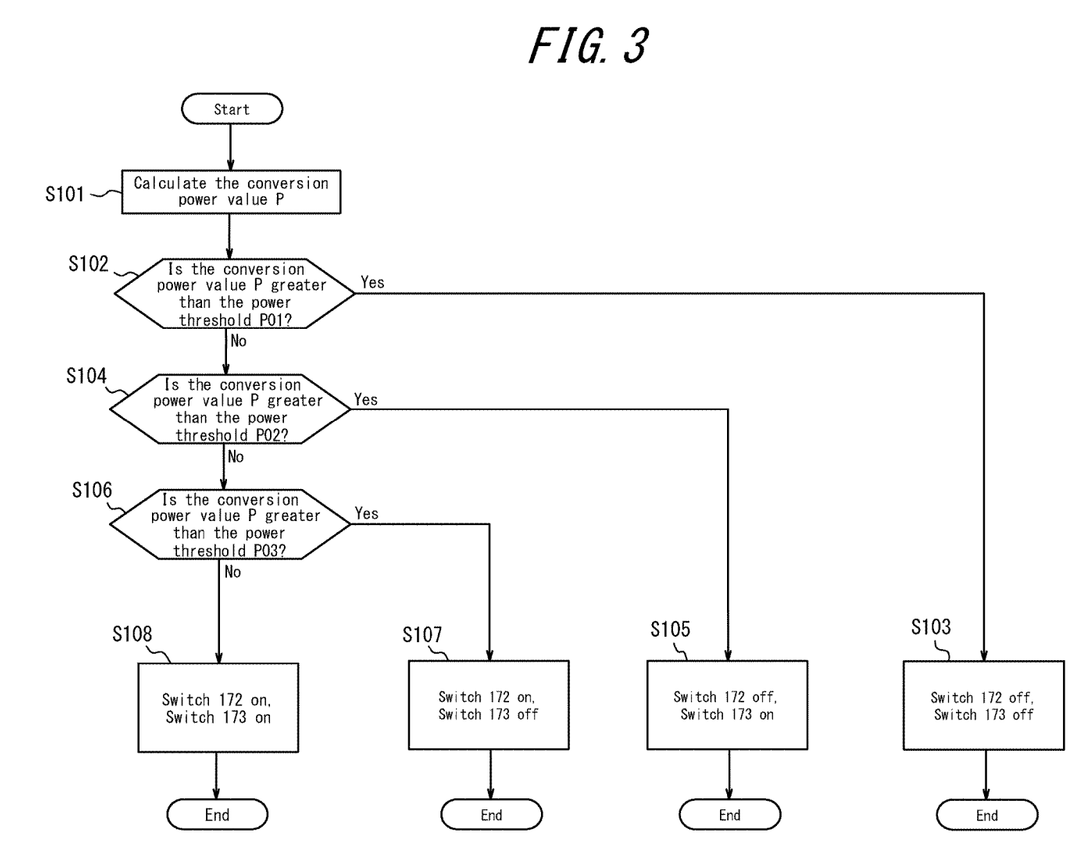
FIG. 3 is a flowchart illustrating an example of operations by the power conversion apparatus according to an embodiment of the disclosure.

With reference to the flowchart in FIG. 3, an example of operations performed by the power conversion apparatus 100 according to the present embodiment is described.

First, the controller 160 of the power conversion apparatus 100 uses the voltage and current acquired from the measurement unit 130 of the DC/DC converter 120 to calculate the conversion power value P to be converted by the DC/DC converter 120 (step S101).

Subsequently, the controller 160 determines whether the calculated conversion power value P is greater than the highest power threshold P01 stored in the memory 161 (step S102). When the controller 160 determines that the calculated conversion power value P is greater than the highest power threshold P01 (step S102: Yes), the process proceeds to step S103. Conversely, when the controller 160 determines that the calculated conversion power value P is not greater than the greatest power threshold P01 (step S102: No), the process proceeds to step S104.

In the process of step S103, the controller 160 outputs the control signals 10, 11 so that the switches 172, 173 changes to the "off" state. As a result, the DC power supplied by the solar cell 210 passes through the noise filters 170, 171 and is supplied to the DC/DC converter 120.

In this manner, when the conversion power value P is greater than the highest power threshold P01 and the power to be converted by the DC/DC converter 120 is large, the noise escaping from the power conversion apparatus 100 is also assumed to increase. Therefore, the switches 172, 173 are set to the "off" state to maximize the noise reduction effect of the DC filter unit 110.

In the process of step S104, the controller 160 determines whether the calculated conversion power value P is greater than the second highest power threshold P02 stored in the memory 161. When the controller 160 determines that the calculated conversion power value P is greater than the second highest power threshold P02 (step S104: Yes), the process proceeds to step S105. Conversely, when the controller 160 determines that the calculated conversion power value P is not greater than the second highest power threshold P02 (step S104: No), the process proceeds to step S106.

In the process of step S105, the controller 160 outputs the control signals 10, 11 so that the switch 172 changes to the "off" state and the switch 173 changes to the "on" state. As a result, the DC power supplied by the solar cell 210 passes through the noise filter 170 and is supplied to the DC/DC converter 120.

In this manner when the conversion power value P is smaller than the highest power threshold P01 and greater than the second highest power threshold P02, the switch 172 is controlled to be in the "off" state and the switch 173 to be in the "on" state, thereby setting the noise reduction effect of the DC filter unit 110 to the second highest level. At this time, the redundant noise filter 171 is unused. As a result, the occurrence of unnecessary power loss caused by the noise filter 171 can be reduced.

In the process of step S106, the controller 160 determines whether the calculated conversion power value P is greater than the lowest power threshold P03 stored in the memory 161. When the controller 160 determines that the calculated conversion power value P is greater than the lowest power threshold P03 (step S106: Yes), the process proceeds to step S107. Conversely, when the controller 160 determines that the calculated conversion power value P is not greater than the lowest power threshold P03 (step S106: No), the process proceeds to step S108.

In the process in step S107, the controller 160 outputs the control signals 10, 11 so that the switch 172 changes to the "on" state and the switch 173 changes to the "off" state. As a result, the DC power supplied by the solar cell 210 passes through the noise filter 171 and is supplied to the DC/DC converter 120.

When the conversion power value P is thus smaller than the second highest power threshold P02 and greater than the lowest power threshold P03, the switch 172 is controlled to be in the "on" state and the switch 173 to be in the "off" state, thereby setting the noise reduction effect of the DC filter unit 110 to the third largest level. At this time, the redundant noise filter 170 is unused. As a result, the occurrence of unnecessary power loss caused by the noise filter 170 can be reduced.

In the process of step S108, the controller 160 outputs the control signals 10, 11 so that the switches 172, 173 changes to the "on" state. As a result, the DC power supplied by the solar cell 210 is supplied to the DC/DC converter 120 without passing through the noise filters 170, 171.

In this manner, when the conversion power value P is smaller than the lowest power threshold P03 and the power to be converted by the DC/DC converter 120 is small, the noise leaking from the power conversion apparatus 100 is assumed to be low. Therefore, the switches 172, 173 are set to the "on" state to minimize the noise reduction effect of the DC filter unit 110. At this time, the redundant noise filters 170, 171 are unused. As a result, the occurrence of unnecessary power loss caused by the noise filters 170, 171 can be reduced.

The power thresholds P01 to P03, P11 to P13, P21 to P23, P31 to P33, and P41 to P43 may be set on the basis of the conversion power values calculated by the controller 160. For example, the controller 160 may calculate the conversion power value of the DC/DC converter 120 in advance, for example upon initialization, and set the power threshold P01 as 75% of the calculated conversion power value, the power threshold P02 as 50% of the calculated conversion power value, and the power threshold P03 as 25% of the calculated conversion power value.

The same configuration as that of the DC filter units 110 to 114 may be adopted in the AC filter unit 150, and the same control as that of the above-described DC filter units 110 to 114 may be performed to select the noise filters to use in the AC filter unit 150.

In the above example, the measurement units 130 to 134 have been described as measuring the power values and currents at the output interface of the DC filter units 110 to 114, but the power values and currents after conversion to a predetermined voltage in the DC/DC converters 120 to 124 may be measured instead. The measurement units 130 to 134 may also be disposed within the inverter 140, and the power values and currents after conversion to AC power may be measured.

In the above example, the controller 160 has been described as calculating the conversion power values to be converted by the DC/DC converters 120 to 124, but the controller 160 may instead calculate a total conversion power value that is the summation of the conversion power values to be converted by the DC/DC converters 120 to 124.

In the example above, the DC filter unit 110 has been described as including two stages of noise filters 170, 171. The number of noise filters, however, is not limited to two. The noise reduction effect has been described as being larger for the noise filter 170 than for the noise filter 171, but the noise reduction effect may instead be the same. The noise filter 170 may also have a smaller noise reduction effect than the noise filter 171.

In the above example, the power conversion apparatus 100 has five paths over which DC power from the solar cells 210 to 213 and the storage battery 300 is supplied through the DC filter units 110 to 114 to the DC/DC converters 120 to 124. The number of paths, however, is not limited to five. For example, the power conversion apparatus 100 may instead have only one path.

In this way, the power conversion apparatus 100 is configured to select the noise filters 170, 171 to use in the DC filter units 110 to 114 in accordance with the conversion power values to be converted by the DC/DC converters 120 to 124, and redundant noise filters are unused. As a result, when using a distributed power source for which the power supplied to the power conversion apparatus 100 changes over a relatively short time, such as the solar cells 210 to 213, the occurrence of unnecessary power loss can be reduced when the power to be converted by the power conversion apparatus 100 is small.

Furthermore, in the power conversion apparatus 100, the noise filters 170, 171 to be used are selected in each of the DC filter units 110 to 114 using control signals 10, 11, control signals 20, 21, control signals 30, 31, control signals 40, 41, and control signals 50, 51. As a result, the noise filters 170, 171 to be used can be selected in each of the DC filter units 110 to 114 even when using distributed power sources with different behaviors, such as the solar cells 210 to 213 and the storage battery 300, and the redundant noise filters can be placed in an unused state. Therefore, when the power converted by the power conversion apparatus 100 is small, the occurrence of unnecessary power loss can be further reduced.

Further Embodiment of the Disclosure

Figure 4:
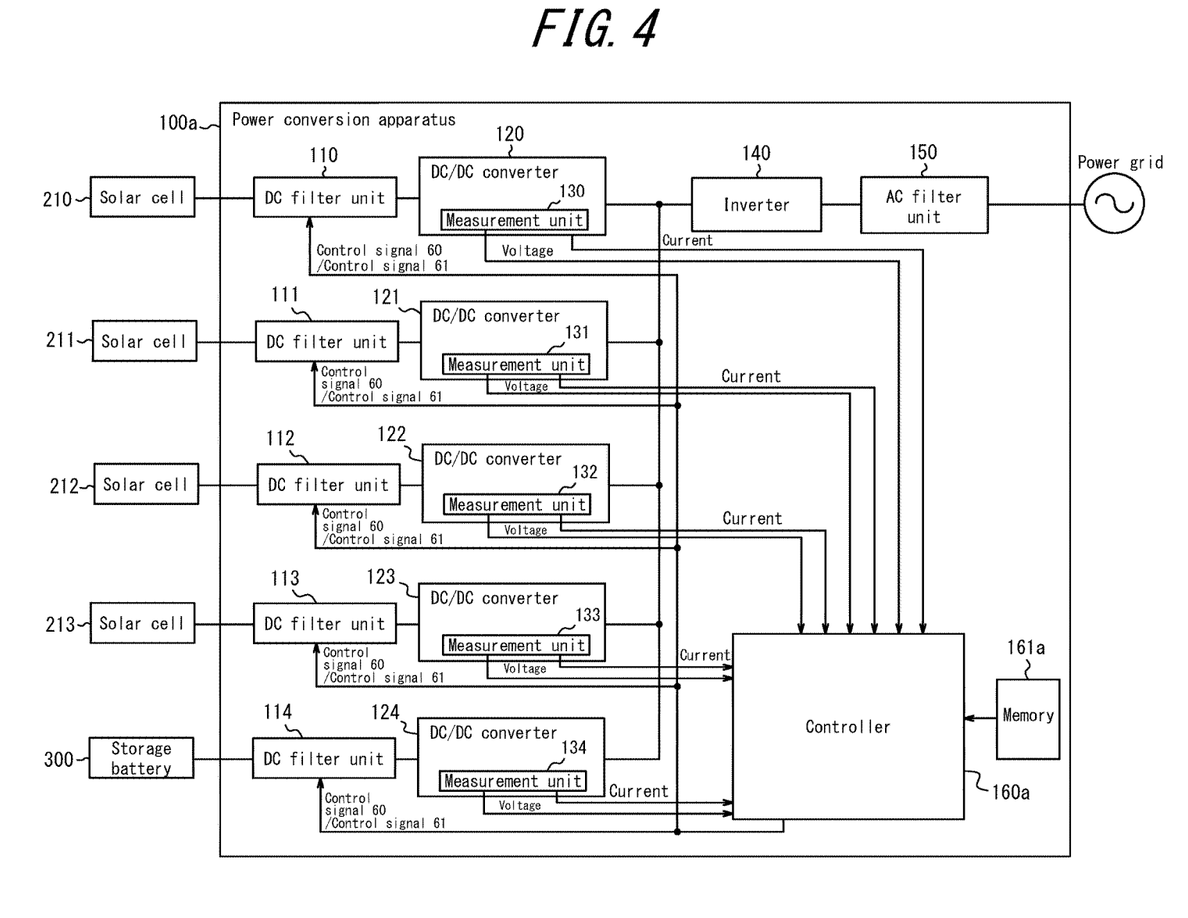
FIG. 4 illustrates an example configuration of a power conversion apparatus according to another embodiment of the disclosure.

The constituent elements in FIG. 4 that are the same as those in FIG. 1 are labeled with the same reference signs, and a description thereof is omitted.

A power conversion apparatus 100a includes DC filter units 110 to 114, DC/DC converters 120 to 124, an inverter 140, an AC filter unit 150, a controller 160a, and a memory 161a.

Here, in the previous embodiment, the controller 160 outputted control signals 10, 11, control signals 20, 21, control signals 30, 31, control signals 40, 41, and control signals 50, 51 to the DC filter units 110 to 114 and controlled the noise filters 170, 171 in the DC filter units 110 to 114 individually. In the present embodiment, the controller 160a outputs control signals 60, 61 to the DC filter units 110 to 114, and controls the noise filters 170, 171 in the DC filter units 110 to 114 collectively.

The controller 160a uses the power values and currents acquired from measurement units 130 to 134 to calculate conversion power values P1 to P5 to be converted respectively by the DC/DC converters 120 to 124. The controller 160a then adds up the calculated conversion power values P1 to P5 to calculate the total conversion power value Pt. The total conversion power value Pt is the summation of the power values at the output interface of the DC filter units 110 to 114. Furthermore, the controller 160a outputs the control signals 60, 61 to each of the DC filter units 110 to 114 to control the noise filters 170, 171 in the DC filter units 110 to 114 on the basis of the calculated total conversion power value Pt and on power thresholds Pt1, Pt2, Pt3 stored in the memory 161a. Here, the power thresholds Pt1 to Pt3 are set so that the power threshold Pt1 is the highest, the power threshold Pt2 is the second highest, and the power threshold Pt3 is the lowest. Specifically, the controller 160 determines whether the calculated total conversion power value Pt is greater than the highest power threshold Pt1. When the controller 160 determines that the calculated total conversion power value Pt is greater than the highest power threshold Pt1, the controller 160 outputs control signals 60, 61 to the DC filters units 110 to 114 so that the switches 172, 173 of the DC filter units 110 to 114 change to the "off" state. Conversely, when the controller 160a determines that the calculated total conversion power value Pt is not greater than the highest power threshold Pt1, the controller 160a further determines whether the calculated total conversion power value Pt is greater than the second highest power threshold Pt2. When the controller 160a determines that the calculated total conversion power value Pt is greater than the second highest power threshold Pt2, the controller 160a outputs control signals 60, 61 to the DC filter units 110 to 114 so that the switch 172 and the switch 173 of each of the DC filter units 110 to 114 change to the "on" state and the "off" state respectively. Conversely, when the controller 160a determines that the calculated total conversion power value Pt is not greater than the second highest power threshold Pt2, the controller 160a further determines whether the calculated total conversion power value Pt is greater than the lowest power threshold Pt3. When the controller 160a determines that the calculated total conversion power value Pt is greater than the lowest power threshold Pt3, the controller 160a outputs control signals 60, 61 to the DC filters units 110 to 114 so that the switch 172 and the switch 173 of each of the DC filter units 110 to 114 change to the "off" state and the "on" state respectively. Conversely, when the controller 160a determines that the calculated total conversion power value Pt is not greater than the lowest power threshold Pt3, the controller 160a outputs the control signals 60, 61 to the DC filter units 110 to 114 so that the switches 172 and 173 of each of the DC filter units 110 to 114 change to the "on" state.

The memory 161a stores the power thresholds Pt1 to Pt3. The power thresholds Pt1 to Pt3 are power thresholds used when controlling the DC filter units 110 to 114.

Figure 5:
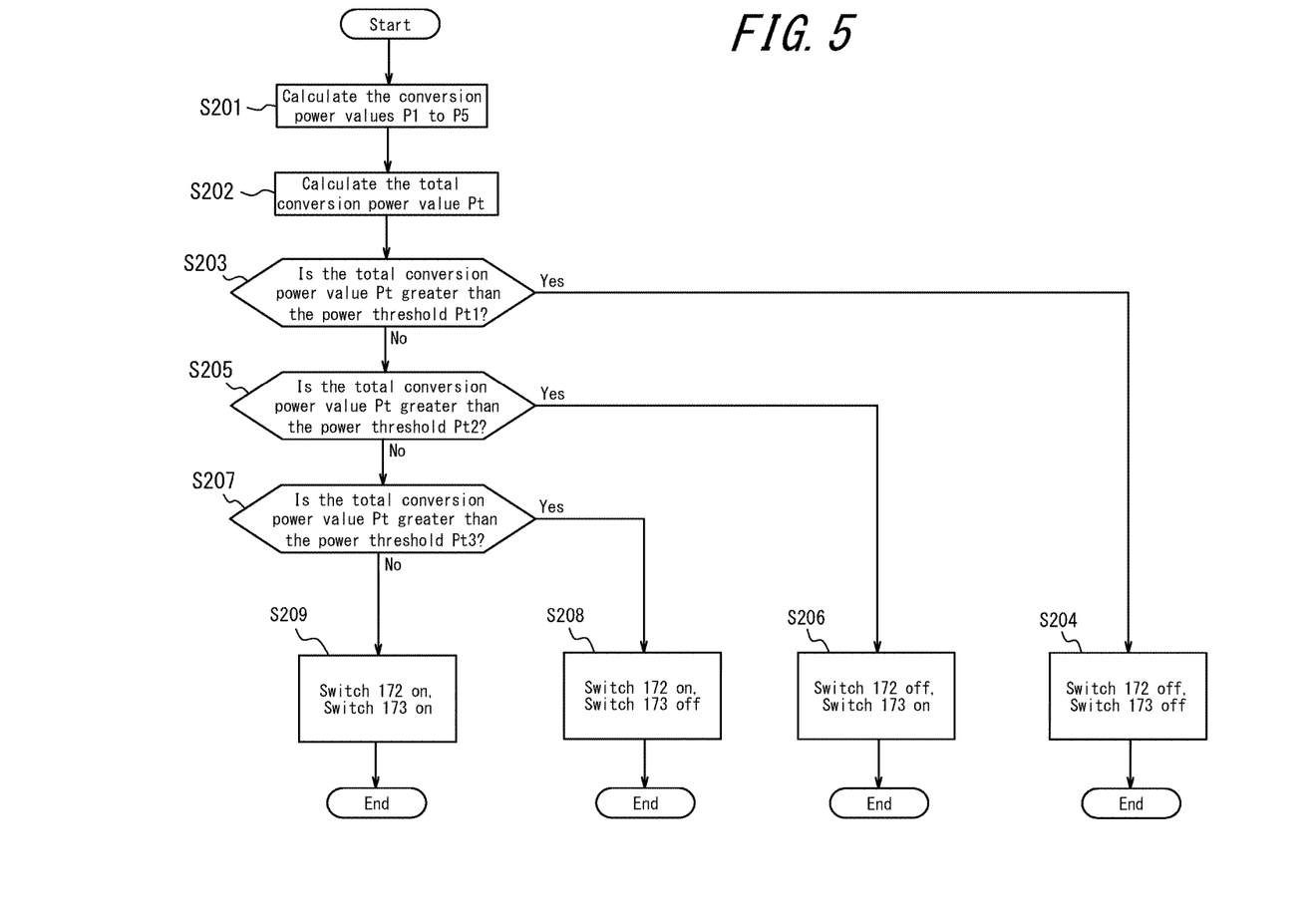
FIG. 5 is a flowchart illustrating an example of operations by the power conversion apparatus according to another embodiment of the disclosure.

With reference to the flowchart in FIG. 5, an example of operations performed by the power conversion apparatus 100a according to the present embodiment is described.

First, the controller 160a of the power conversion apparatus 100a uses the voltages and currents acquired from measurement units 130 to 134 of the DC/DC converters 120 to 124 to calculate conversion power values P1 to P5 to be converted respectively by the DC/DC converters 120 to 124 (step S201). The controller 160a then adds up the calculated conversion power values P1 to P5 to calculate the total conversion power value Pt (step S202).

Subsequently, the controller 160a determines whether the calculated total conversion power value Pt is greater than the highest power threshold Pt1 stored in the memory 161a (step S203). When the controller 160a determines that the calculated total conversion power value Pt is greater than the highest power threshold Pt1 (step S203: Yes), the process proceeds to step S204. Conversely, when the controller 160 determines that the calculated total conversion power value Pt is not greater than the highest power threshold Pt1 (step S203: No), the process proceeds to step S205.

In the process of step S204, the controller 160a outputs the control signals 60, 61 to the DC filter units 110 to 124 so that the switches 172, 173 of the DC filter units 110 to 124 change to the "off" state. As a result, the DC power supplied by the solar cells 210 to 213 and the storage battery 300 passes through the noise filters 170, 171 in the DC filter units 110 to 124 and is supplied to the DC/DC converters 120 to 124.

In this manner, when the total conversion power value Pt is greater than the highest power threshold Pt1 and the power to be converted by the DC/DC converters 120 to 124 is large, the noise escaping from the power conversion apparatus 100 is also assumed to increase. Therefore, the switches 172, 173 in each of the DC filter units 110 to 114 are set to the "off" state to maximize the noise reduction effect of the DC filter units 110 to 114.

In the process of step S205, the controller 160a determines whether the calculated total conversion power value Pt is greater than the second highest power threshold Pt2 stored in the memory 161a. When the controller 160a determines that the calculated total conversion power value Pt is greater than the second highest power threshold Pt2 (step S205: Yes), the process proceeds to step S206. Conversely, when the controller 160a determines that the calculated total conversion power value Pt is not greater than the second highest power threshold Pt2 (step S205: No), the process proceeds to step S207.

In the process of step S206, the controller 160a outputs the control signals 60, 61 to the DC filters unit 110 to 124 so that the switch 172 and the switch 173 of the DC filter units 110 to 124 change to the "off" state and the "on" state respectively. As a result, the DC power supplied by the solar cells 210 to 213 and the storage battery 300 passes through the noise filter 170 in each of the DC filter units 110 to 114 and is supplied to the DC/DC converters 120 to 124.

In this manner, when the total conversion power value Pt is smaller than the highest power threshold P1 and greater than the second highest power threshold Pt2, the switch 172 and the switch 173 in each of the DC filter units 110 to 124 are controlled to be in the "off" state and the "on" state respectively, thereby setting the noise reduction effect of the DC filter units 110 to 114 to the second highest level. At this time, the redundant noise filter 171 in each of the DC filter units 110 to 114 is unused. As a result, the occurrence of unnecessary power loss caused by the noise filter 171 can be reduced.

In the process of step S207, the controller 160a determines whether the calculated total conversion power value Pt is greater than the lowest power threshold Pt3 stored in the memory 161a. When the controller 160a determines that the calculated total conversion power value Pt is greater than the lowest power threshold Pt3 (step S207: Yes), the process proceeds to step S208. Conversely, when the controller 160a determines that the calculated total conversion power value Pt is not greater than the lowest power threshold Pt3 (step S207: No), the process proceeds to step S209.

In the process of step S208, the controller 160a outputs the control signals 60, 61 to the DC filter units 110 to 124 so that the switch 172 and the switch 173 of the DC filter units 110 to 124 change to the "on" state and the "off" state respectively. As a result, the DC power supplied by the solar cells 210 to 213 and the storage battery 300 passes through the noise filter 171 in the DC filter units 110 to 114 and is supplied to the DC/DC converters 120 to 124.

When the total conversion power value Pt is thus smaller than the second highest power threshold Pt2 and greater than the lowest power threshold Pt3, the switch 172 and the switch 173 in the DC filter units 110 to 114 are controlled to be in the "on" state and the "off" state respectively, thereby setting the noise reduction effect of the DC filter units 110 to 114 to the third highest level. At this time, the redundant noise filter 170 in the DC filter units 110 to 114 is unused. As a result, the occurrence of power loss caused by the noise filter 170 can be reduced.

In the process of step S209, the controller 160a outputs the control signals 60, 61 to the DC filter units 110 to 114 so that the switches 172, 173 of the DC filter units 110 to 114 change to the "on" state. As a result, the DC power supplied by the solar cells 210 to 213 and the storage battery 300 is supplied to the DC/DC converters 120 to 124 without passing through the noise filters 170, 171 in the DC filter units 110 to 114.

In this manner, when the total conversion power value Pt is smaller than the lowest power threshold Pt3 and the power to be converted by the DC/DC converters 120 to 124 is small, the noise leaking from the power conversion apparatus 100a is assumed to be low. Therefore, the switches 172, 173 in each of the DC filter units 110 to 114 are set to the "on" state to minimize the noise reduction effect of the DC filter units 110 to 114. At this time, the redundant noise filters 170, 171 in the DC filter units 110 to 114 are unused. As a result, the occurrence of power loss caused by the noise filters 170, 171 can be reduced.

The power thresholds PH to Pt3 may be set in accordance with a total conversion power value calculated in advance by the controller 160a. For example, the controller 160a may calculate the total conversion power value of the DC/DC converters 120 to 124 in advance, for example upon initialization, and set the power threshold PH as 75% of the calculated total conversion power value, the power threshold Pt2 as 50% of the calculated total conversion power value, and the power threshold Pt3 as 25% of the calculated total conversion power value.

The same configuration as that of the DC filter units 110 to 114 may be adopted in the AC filter unit 150, and the same control as that of the above-described DC filter units 110 to 114 may be performed to select the noise filters to use in the AC filter unit 150.

In the above example, the measurement units 130 to 134 have been described as measuring the power values and currents at the output interface of the DC filter units 110 to 114, but the power values and currents after conversion to a predetermined voltage in the DC/DC converters 120 to 124 may be measured instead. The measurement units 130 to 134 may also be disposed within the inverter 140, and the power values and currents after conversion to AC power may be measured.

In the above example, the DC filter unit 110 has been described as including two stages of noise filters 170, 171. The number of noise filters, however, is not limited to two. The noise reduction effect has been described as being larger for the noise filter 170 than for the noise filter 171, but the noise reduction effect may instead be the same. The noise filter 170 may also have a smaller noise reduction effect than the noise filter 171.

In the above example, the power conversion apparatus 100 has five paths over which DC power from the solar cells 210 to 213 and the storage battery 300 is supplied through the DC filter units 110 to 114 to the DC/DC converters 120 to 124. The number of paths, however, is not limited to five.

In this way, the power conversion apparatus 100a is configured to select the noise filters 170, 171 to use in the DC filter units 110 to 114 in accordance with the total conversion power value to be converted by the DC/DC converters 120 to 124, and redundant noise filters are unused. As a result, when using a distributed power source for which the power supplied to the power conversion apparatus 100 changes over a relatively short time, such as the solar cells 210 to 213, the occurrence of unnecessary power loss can be reduced when the power to be converted by the power conversion apparatus 100a is small.

Furthermore, in the power conversion apparatus 100a, the control signals 60, 61 are used for collective selection of the noise filters 170, 171 to use in the DC filter units 110 to 124. Therefore, the number of output terminals that the controller 160 has for the control signals and the number of cables for the control signals can be reduced. As a result, an increase in size and cost of the power conversion apparatus 100a can be minimized.

Although embodiments of the present disclosure have been described on the basis of drawings and examples, it is to be noted that various changes and modifications will be apparent to those skilled in the art based on the present disclosure. Therefore, such changes and modifications are to be understood as included within the scope of the disclosure. For example, the functions and the like included in the various components and steps may be reordered in any logically consistent way. Furthermore, components or steps may be combined into one or divided.

The control of the present disclosure is described as a series of operations executed by a computer system and other hardware that can execute program instructions. Examples of the computer system and other hardware include a general-purpose computer, a personal computer (PC), a dedicated computer, a workstation, and other programmable data processing apparatuses. It should be noted that in each embodiment, various operations are executed by a dedicated circuit (for example, individual logical gates interconnected in order to execute a particular function) implemented by program instructions (software), or by a logical block, program module, or the like executed by one or more processors. The one or more processors that execute a logical block, program module, or the like are, for example, one or more of the following: a microprocessor, a central processing unit (CPU), an application specific integrated circuit (ASIC), a digital signal processor (DSP), a programmable logic device (PLD), a field programmable gate array (FPGA), a controller, a microcontroller, an electronic device, another apparatus designed to be capable of executing the functions disclosed herein, and/or a combination of any of the above. The embodiments disclosed herein are, for example, implemented by hardware, software, firmware, middleware, microcode, or a combination of any of these.

REFERENCE SIGNS LIST 100, 100a Power conversion apparatus
110, 111, 112, 113, 114 DC filter unit
120, 121, 122, 123, 124 DC/DC converter
130, 131, 132, 133, 134 Measurement unit
140 Inverter
150 AC filter unit
160, 160a Controller
161, 161a Memory
170, 171 Noise filter
172, 173 Switch
210, 211, 212, 213 Solar cell
300 Storage battery

The invention claimed is:

1. A power conversion apparatus for converting direct current (DC) power supplied by a distributed power source into alternating current (AC) power, the power conversion apparatus comprising:
a filter unit including:
a noise filter configured to reduce noise in the DC power supplied by the distributed power source, and
a switch configured to connect an input terminal and an output terminal of the noise filter; and
a controller configured to control the switch in accordance with output power of the filter unit.

2. The power conversion apparatus of claim 1, further comprising:
a memory configured to store an association between the output power and a level of the noise as a power threshold, wherein
the controller is configured to control the switch so as to connect the input terminal and the output terminal of the noise filter when the output power falls below the power threshold.

3. The power conversion apparatus of claim 1, wherein the noise filter comprises a choke coil.

4. A power conversion apparatus for converting direct current (DC) power supplied by a plurality of distributed power sources into alternating current (AC) power, the power conversion apparatus comprising:
a plurality of filter units configured to reduce noise in the DC power supplied by the plurality of distributed power sources; and
a controller, wherein
each filter unit includes a noise filter configured to reduce the noise in the DC power supplied by the plurality of distributed power sources, and a switch configured to connect an input terminal and an output terminal of the noise filter, and
the controller is configured to control a plurality of the switches in accordance with a total output power that is a summation of output powers of the plurality of filter units.

5. The power conversion apparatus of claim 4, further comprising:
a memory configured to store an association between the output power and a level of the noise as a power threshold, wherein
the controller is configured to control the plurality of the switches so that each switch connects the input terminal and the output terminal of the respective noise filter when the total output power falls below the power threshold.

6. The power conversion apparatus of claim 4, wherein the noise filter comprises a choke coil.

7. A power conversion method in a power conversion apparatus for converting direct current (DC) power supplied by a distributed power source into alternating current (AC) power, the power conversion apparatus comprising a filter unit configured to reduce noise in the DC power supplied by the distributed power source, the filter unit including a noise filter configured to reduce the noise in the DC power supplied by the distributed power source and a switch configured to connect an input terminal and an output terminal of the noise filter, the power conversion method comprising:
calculating an output power of the filter unit; and
controlling the switch in accordance with the output power.

8. A power conversion method in a power conversion apparatus for converting direct current (DC) power supplied by a plurality of distributed power sources into alternating current (AC) power, the power conversion apparatus comprising a plurality of filter units configured to reduce noise in the DC power supplied by the plurality of distributed power sources, each filter unit including a noise filter configured to reduce the noise in the DC power supplied by the plurality of distributed power sources and a switch configured to connect an input terminal and an output terminal of the noise filter, the power conversion method comprising:
calculating a total output power that is a summation of the output powers of the plurality of filter units; and
controlling a plurality of the switches in accordance with the total output power.

9. A power conversion system comprising a distributed power source and a power conversion apparatus for converting direct current (DC) power supplied by the distributed power source into alternating current (AC) power, wherein
the power conversion apparatus comprises:
a filter unit including a noise filter configured to reduce noise in the DC power supplied by the distributed power source, and a switch configured to connect an input terminal and an output terminal of the noise filter; and
a controller configured to control the switch in accordance with output power of the filter unit.

10. A power conversion system comprising a plurality of distributed power sources and a power conversion apparatus for converting direct current (DC) power supplied by the plurality of distributed power sources into alternating current (AC) power, wherein the power conversion apparatus comprises:
  a plurality of filter units configured to reduce noise in the DC power supplied by the plurality of distributed power sources; and
  a controller,
wherein each filter unit includes a noise filter configured to reduce the noise in the DC power input from the plurality of distributed power sources and a switch configured to connect an input terminal and an output terminal of the noise filter, and
the controller controls a plurality of the switches in accordance with a total output power that is a summation of output powers of the plurality of filter units.

* * * * *